United States Patent [19]

van der Stegen

[11] 4,364,964

[45] Dec. 21, 1982

[54] PROCESS OF THE DECAFFEINATION OF GREEN COFFEE BEANS

[75] Inventor: Gerrit H. D. van der Stegen, Montfoort, Netherlands

[73] Assignee: D.E.J. International Research Company B.V., Utrecht, Netherlands

[21] Appl. No.: 181,899

[22] Filed: Aug. 27, 1980

Related U.S. Application Data

[63] Continuation of Ser. No. 927,734, Jul. 24, 1978, abandoned.

[30] Foreign Application Priority Data

Aug. 5, 1977 [GB] United Kingdom ............... 32859/77

[51] Int. Cl.³ ............................................... A23F 5/22
[52] U.S. Cl. .................................... 426/422; 426/427; 544/274
[58] Field of Search ....................... 426/422, 427, 271; 544/274

[56] References Cited

U.S. PATENT DOCUMENTS 3,108,876 10/1963 Turben et al. ....................... 426/271
4,113,887 9/1978 Kramer et al. ...................... 426/422
4,113,888 9/1978 Henig et al. ........................ 426/422

*Primary Examiner*—Joseph M. Golian
*Attorney, Agent, or Firm*—Cushman, Darby & Cushman

[57] ABSTRACT

A process for removal of caffeine from green coffee beans is disclosed by extraction with an aqueous liquid and preferential adsorption of caffein from the extract by means of a synthetic polymer resin of the type that is obtainable by polymerization or copolymerization of monomers containing aromatic ring systems and acid groups, and whereby the ratio of the total adsorption capacity for caffein to the total ion exchange capacity is larger than about 1 and smaller than about 25.

11 Claims, No Drawings

PROCESS OF THE DECAFFEINATION OF GREEN COFFEE BEANS

CROSS REFERENCE TO RELATED APPLICATIONS

This is a continuation of my earlier application Ser. No. 927,734, filed July 24, 1978, now abandoned.

BACKGROUND OF THE INVENTION

The present invention relates to a process for the decaffeination of green coffee beans.

Commercially available processes for the production of decaffeinated coffee make use of organic solvents. The disadvantages of these processes reside either in the possible health hazard involved or in the inflammability of the solvents in question. For this reason other methods have been sought. One line of approach has been treating an aqueous extract, obtained either from green beans or from roasted coffee, with a material which is selectively adsorbent for caffeine, followed by regenerating the caffeine "loaded" material to recover the caffeine. For various reasons none of the processes proposed has been really successful up till now.

A discussion of the prior art is to be found in German patent application No. 2,600,492 and U.S. Pat. No. 4,031,251. The process described in that patent makes use of a non-ionogenic synthetic polymer resin with hydrophobic characteristics and having a dipole moment of less than 2.0 Debye, preferably less than 0.5 Debye. This process avoids the difficulties encountered in the process according to U.S. Pat. No. 3,108,876. According to U.S. Pat. No. 3,108,876, strongly ionogenic cation exchanging resins are used (column 2, lines 16-21), which change the ionogenic composition of the extract, thus, for example, the pH is drastically changed. Other difficulties, however, are introduced, which are related e.g. to the hydrophobic nature of the resin. It is considered necessary to introduce organic solvents in the process to regenerate the resin. This means that a process with the stated object to avoid organic solvents again must have recourse to such solvents and that the process is appreciably complicated.

DESCRIPTION OF THE INVENTION

Now according to the present invention, use is made of a synthetic polymer resin with an adsorbent surface of an aromatic character and whereby the hydrophobic character of this adsorbent surface is suppressed and the adsorption of chlorogenic acid ions is decreased by the presence of a sufficient number of acidic groups, the influence of which, either with regard to relative frequency or with regard to acidic strength, is so limited that the selectivity for dry solids in the process is not markedly influenced by cation exchange.

Following this concept according to the present invention, there is provided a process for the decaffeination of green coffee beans wherein the beans are extracted with an aqueous liquid and the extract obtained is treated with a preferentially caffeine adsorbent synthetic polymer resin, the synthetic polymer resin being one of the type obtainable by polymerizing or copolymerizing monomers which contain aromatic ring systems and acid groups and by which furthermore the ratio of the total adsorption capacity for caffeine to the total ion exchange capacity is larger than about 1 and smaller than about 25, preferably between 5 and 15.

The basic idea underlying the invention is, that by selecting the resin as just defined there will not be a substantial disturbance of the ionogenic composition of the extract of the green beans, while nevertheless the use of organic solvents is completely avoided, i.e., also in the regeneration phase of the resin.

Another advantage of the resins to be used according to the present invention is connected with their selectivity with regard to caffeine adsorption in an aqueous system containing chlorogenic acid and caffeine. The aqueous extract of the green beans contains large quantities of chlorogenic acid. For a Robusta coffee the dissolved dry matter will have e.g. the following composition: 45% chlorogenic acid, 10% caffeine and 45% other solubles. The distribution coefficients in a water-adsorbent system, and in which the adsorbent is Duolite S761, supplied by Diaprozim Benelux, Brussels, are such that after the extract just described has been treated, the adsorbed soluble dry matter in the substantially fully 'loaded' adsorbent, used to a point where it has to be regenerated, will have approximately the following composition: 60% chlorogenic acid, 30% caffeine and 10% other substances. The good selectivity of the resins to be used according to the invention will also manifest itself in the regeneration phase of the 'loaded' resins, in which the separation between caffeine, on the one hand, and chlorogenic acid on the other, is further accomplished.

The appropriate ratio of the total adsorbent capacity for caffeine to the total ion exchange capacity, as defined above, can be obtained by the presence in the resin of a small number of relatively strongly ionogenic polar groups. This can be achieved, for example, by incorporating in known polystyrene/divinylbenzene 'Amberlite' resins such as XAD2 and XAD4 a small number of sulfonic acid groups. Techniques for doing this are described e.g. in Kirk Othmer Encyclopedia of Chemical Technology, second edition, vol. 11, pages 874 et seq.

In a preferred embodiment of the invention use is made of a resin produced by polymerizing or copolymerizing monomers with weakly acidic groups, so that the $P_{Ka}$ of the monomer with the acidic group is higher than about 6.5 $P_{Ka}$ values as can be found in e.g. Handbook of Chemistry and Physics, 57th Ed., R. W. Weast ed., Cleveland, Ohio, (1976); section D, p. 150.

Formophenolic resins fall under this category of resins. The preparation of such resins is well known.

Duolite S761, which belongs to this group, has been found to be particularly effective, having a ratio as defined before to total adsorption capacity for caffeine to total ion-exchange capacity of about 10. It is also possible to use resins in which, instead of a phenol group, a pyrrol or naphtol group is incorporated.

More particularly the process according to the invention comprises:

(a) treating green beans at elevated temperatures, preferably between 50° C. and 100° C., with an aqueous solution of green coffee bean solubles which is unsaturated with regard to caffeine, resulting in extracting a desired percentage of caffeine from the beans;

(b) treating the extract obtained under (a) at a temperature of 50° to 100° C. with a synthetic polymer resin of the type as defined above, resulting in removing a desired percentage of caffeine from said extract and producing a caffeine loaded resin, and (c) re-using the solution obtained from (b) in step (a).

This process can be carried out in various ways.

In a particular embodiment of a batch process the pre-soaked beans can be mixed with the particulated resin material and shaken at a temperature of 50°–100° C. with the solution obtained in a preceding batch. In this case the steps (a) and (b) are conducted concurrently and the resin and beans have to be separated after each batch.

In another embodiment of a batch process the beans and resin are kept separate. Here there are two possibilites. In one case the beans are extracted, and the extract thereupon after separation from the beans brought in contact with the resin. In the other case the extract is circulated between and through a bed of beans and a bed of resin.

Continuous processes are also possible. Thus, for example, it is possible to use two counter-current extraction columns in one of which the pre-soaked beans are moved countercurrently to the extract and in the second the resin is moved countercurrently to the extract leaving the first column. Also, one or both of the counter current extraction columns can be replaced by an extraction battery.

In a preferred embodiment of the invention the caffeine loaded resin is regenerated in two steps. In the first step, the resin is rinsed with cold water (0° C.-ambient temperature), resulting in the removal of a desired percentage of the non-caffeine solubles. At this temperature, owing to the difference in their distribution coefficients, caffeine is much more tenaciously retained by the adsorbent than the most important non-caffeine soluble, being chlorogenic acid. The second step of the regeneration process; the resin is rinsed with warm water (50°–100° C.), resulting in the removal of a desired percentage of caffeine. Preferably this washing process is continued till the washwater has a caffeine content less than 0.5 g/l. The solution obtained with the cold wash is preferably returned to the extraction step, where it prevents the extraction of the non-caffeine solubles from the coffee beans.

During the first regeneration step there is passed over the resin bed a volume of water of 1 to 15 times the void volume of the bed and preferably between 3 and 10 times the void volume, the linear velocity of the water through the bed being 0.25–10 cm/min. and preferably between 0.5–5 cm/min. In the second regeneration step there is passed over the resin bed a volume of water preferably 25–100 times the void volume of the bed, at a linear velocity of the water within the same range as defined for the first regeneration step.

If a sufficient quantity of water is used for the first regeneration step, it is possible to wash out a very high percentage of the non-caffeine solubles, including chlorogenic acid, so that the second regeneration step with hot water will produce a solution in which the dry matter will consist to a very high percentage of caffeine. The recovery of the caffeine from that solution is relatively easy. If this course of action is followed, however, a relatively large quantity of cold wash water will be obtained and it may be necessary to concentrate it before re-using it in the process e.g. as described below. This may be done by any conventional means, such as freeze concentration, reversed osmosis or ultrafiltration.

Especially in case the first regeneration step with cold water (cold wash) is kept relatively short, so that the amount of residual chlorogenic acid in the subsequent warm wash is relatively high, the chlorogenic acid in this warm wash may be extracted by known anionic resin exchangers.

The cold wash, as the case may be after a certain degree of concentration, may be returned at a convenient point of the process. It may be used to pre-soak the green beans. It may also in a counter-current process be introduced at a point where its caffeine content corresponds with the caffeine content of the countercurrent extraction stream or adsorption stream.

The resins according to the present invention can also advantageously be used for the decaffeination of extracts of roasted coffee.

The present invention will now be further illustrated by way of the following Examples.

EXAMPLE 1

100 g Ivory Coast Robusta coffee and 200 g Duolite S761 resin were shaken overnight with 900 ml substantially caffeine-free extract of green coffee at a temperature of 75° C. The extract, the beans and the resin were separated by sieving. The beans were rinsed with cold water for a short time and dried on a fluid bed drier to a moisture content of about 10%. By this treatment the caffeine content of the beans, originally 2.05%, was reduced to 0.10%.

EXAMPLE 2

100 g Ivory Coast Robusta coffee was introduced into a vessel which was kept at 95° C. 200 g Duolite S761 resin was introduced into an adsorption column, which was kept at a temperature of 75° C. The vessel and the column were connected by ducts and a pump, so as to produce a system for circulating liquid through the beans and the resin. This system was filled with a substantially caffeine-free extract of green beans, which was pumped around for 6 hours at a rate of 0.5 l per hour. The beans were separated from the extract and further treated as described in Example 1. The caffeine content, originally 1.7%, was reduced to 0.10%.

Duolite S-761 (Diamond Shamrock) is a macroporous adsorbent resin having hydroxyl groups with a phenolic matrix. This adsorbent resin is highly porous, resistant to attrition, regenerated with alkali and is a very weak acid resin.

I claim:

1. A continuous process for extracting caffeine from an aqueous solution containing same with an adsorbent and regenerating the adsorbent with water, said process comprising the steps of:
   (1) contacting a caffeine-laden aqueous solution at a temperature of about 50° to about 100° C. with a macroporous synthetic polymer resin adsorbent produced by polymerizing a monomer containing aromatic ring systems and polar acidic groups having a $P_K$ value greater than 6.5 and wherein the ratio of to adsorption capacity for said caffeine to total ion exchange capacity of said polymer is greater than 1 and less than 25 and thereafter
   (2) regenerating the caffeine-laden resin adsorbent by contacting it with water as the sole regenerating means and removing the adsorbed caffeine from said resin.

2. The process of claim 1 wherein said adsorbent resin is a highly porous, very weak-acid resin having a phenolic matrix.

3. A process according to claim 1, wherein a formo-phenolic resin is used.

4. A continuous process for the decaffeination of green coffee beans comprising
  (a) a treating caffeine-containing green coffee beans at a temperature of about 50° to about 100° C. with an aqueous solution containing green coffee bean solubles which solution is caffeine unsaturated, and thereby extracting a predetermined amount of caffeine from said beans and forming an aqueous caffeine-containing extract;
  (b) treating the extract produced in step (a) at a temperature of about 50° to 100° C. with a synthetic polymer resin,
    said polymer produced by the polymerization or the copolymerization of monomers containing aromatic ring systems and acidic groups, the monomer containing said acidic group having a $P_{Ka}$ of at least 6.5,
    and thereby extracting a predetermined amount of caffeine from said extract producing a caffeine loaded resin and an aqueous solution, and thereafter
  (c) recirculating the aqueous solution of step (b) to use as the aqueous extracting solution of step (a)
  (d) regenerating the caffeine-laden resin adsorbent by contacting it with water as the sole regenerating means and removing the adsorbed caffeine from said resin.

5. The process according to claim 4 wherein said polymer resin has a ratio of the total adsorption capacity for caffeine to the total ion exchange capacity greater than 1 and less than 25.

6. A continuous aqueous process for the decaffeination of green coffee beans devoid of organic solvents and regenerating the resin employed, said process comprising the steps of:
  (a) treating caffeine-containing green coffee beans at a temperature of about 50° to about 100° C. with an aqueous solution containing green coffee bean solubles which solution is caffeine unsaturated, and thereby extracting a predetermined amount of caffeine from said beans and forming an aqueous caffeine-containing extract containing green coffee bean solubles;
  (b) treating the extract produced in step (a) at a temperature of about 50° to about 100° C. with a synthetic polymer resin highly selective in the adsorption of caffeine in an aqueous system containing chlorogenic acid and caffeine,
    said polymer produced by the polymerization or the copolymerization of monomers containing aromatic ring systems and acidic groups, the monomer containing said acidic group having a $P_{Ka}$ of at least 6.5,
    the ratio of total adsorption capacity for caffeine to total ion exchange capacity of said polymer being greater than 1 and less than 25,
    and thereby extracting a predetermined amount of caffeine from said extract producing a caffeine loaded resin and an aqueous solution substantially free from caffeine, and thereafter regenerating the resin by
  (c) rinsing the solids and caffeine-loaded resin produced in step (b) with cold water at a temperature of about 0° C. to about ambient thereby extracting, removing and discharging the non-caffeine solids from the resin leaving a caffeine loaded resin,
  (d) rinsing the caffeine-loaded resin remaining from step (c) with hot water at a temperature of about 50° C. to about 100° C. thereby extracting, removing and discharging caffeine from the resin and freeing the resin of green coffee bean solids and caffeine, and thereafter
  (e) reusing the resin of step (d), the entire process being conducted in the absence of organic solvents.

7. The process according to claim 6 including continuing the hot water rinsing of step (c) until the wash water passed from said resin is reduced in caffeine content to less than 0.5 g/l.

8. The process according to claim 6 wherein the volume of cold water used in step (c) is from 1 to 15 times the void volume of the loaded resin and the velocity of cold rinse water through the bed is between 0.25 and 10 cm/minute.

9. The process according to claim 6 or 8 wherein the volume of hot water used in step (d) is from 25 to 100 times the void volume of the loaded resin and the velocity of hot rinse water through the bed is between 0.25 and 10 cm/minute.

10. The process according to claim 1 or 6 wherein said ratio is between about 5 and 15.

11. The process according to claim 10 wherein said ratio is about 10.

* * * * *